(12) United States Patent
Hammond (10) Patent No.: US 10,055,890 B2
(45) Date of Patent: Aug. 21, 2018

(54) AUGMENTED REALITY FOR WIRELESS MOBILE DEVICES

(71) Applicant: Harris Corporation, Melbourne, FL (US)

(72) Inventor: John B. Hammond, Herndon, VA (US)

(73) Assignee: Harris Corporation, Melbourne, FL (US)

( * ) Notice: Subject to any disclaimer, the term of this patent is extended or adjusted under 35 U.S.C. 154(b) by 29 days.

(21) Appl. No.: 15/266,136

(22) Filed: Sep. 15, 2016

(65) Prior Publication Data

US 2017/0004658 A1     Jan. 5, 2017

Related U.S. Application Data (60) Division of application No. 14/830,407, filed on Aug. 19, 2015, which is a continuation of application No.
(Continued)

(51) Int. Cl.
| | |
|---|---|
| *G06T 19/00* | (2011.01) |
| *G06T 7/73* | (2017.01) |
| *G09G 5/00* | (2006.01) |
| *G06K 9/46* | (2006.01) |
| *G06T 11/60* | (2006.01) |

(Continued)

(52) U.S. Cl.
CPC ........ *G06T 19/006* (2013.01); *G06K 9/00671* (2013.01); *G06K 9/4671* (2013.01); *G06T 7/73* (2017.01); *G06T 11/60* (2013.01); *G06T 15/00* (2013.01); *G09G 5/003* (2013.01); *G06T 2215/16* (2013.01); *G09G 2370/16* (2013.01)

(58) Field of Classification Search
CPC .................................................. G06T 19/006
See application file for complete search history.

(56) References Cited

U.S. PATENT DOCUMENTS

| | | |
|---|---|---|
| 3,589,796 A | 6/1971 | Schaefer |
| 4,729,634 A | 3/1988 | Raber |

(Continued)

OTHER PUBLICATIONS

International Search Report and Written Opinion in counterpart International Application No. PCT/US13/66511, dated Apr. 24, 2014.

*Primary Examiner* — Kee M Tung
*Assistant Examiner* — Grace Q Li
(74) *Attorney, Agent, or Firm* — Edell, Shapiro & Finnan, LLC (57) ABSTRACT

A model includes model layers on which a wireframe representation of objects located at geographic coordinates is stored in a memory such that surface detail of the objects increases from a base model layer to an uppermost model layer. Digital data layers stored in the memory that encompass digital coordinates corresponding with the geographic coordinates. Digital content for augmenting scenes is stored on pre-selected digital data layers at pre-selected digital coordinates on those layers. One or more of the digital data layers are logically linked with one or more of the model layers. When the location and spatial orientation of a mobile device in which a scene is viewed is received, the digital content on the digital data layer logically linked to one of the model layers is transmitted over a wireless communication channel to the mobile device.

18 Claims, 11 Drawing Sheets

Related U.S. Application Data

13/837,902, filed on Mar. 15, 2013, now Pat. No. 9,129,429.

(60) Provisional application No. 61/717,788, filed on Oct. 24, 2012.

(51) Int. Cl.
  *G06T 15/00* (2011.01)
  *G06K 9/00* (2006.01)

(56) References Cited

U.S. PATENT DOCUMENTS

| | | | |
|---|---|---|---|
| 4,808,979 | A | 2/1989 | DeHoff et al. |
| 5,355,224 | A | 10/1994 | Wallace |
| 5,585,813 | A | 12/1996 | Howard |
| 5,661,604 | A | 8/1997 | Kuba |
| 5,838,490 | A | 11/1998 | Fritz |
| 6,098,118 | A | 8/2000 | Ellenby et al. |
| 6,181,302 | B1 | 1/2001 | Lynde |
| 6,349,001 | B1 | 2/2002 | Spitzer |
| 6,362,912 | B1 | 3/2002 | Lewis et al. |
| 6,445,362 | B1 | 9/2002 | Tegreene |
| 6,452,544 | B1 | 9/2002 | Hakala et al. |
| 6,578,017 | B1 | 6/2003 | Ebersole et al. |
| 6,633,304 | B2 | 10/2003 | Anabuki et al. |
| 6,917,370 | B2 | 7/2005 | Benton |
| 6,937,221 | B2 | 8/2005 | Lippert et al. |
| 7,002,551 | B2 | 2/2006 | Azuma et al. |
| 7,075,687 | B2 | 7/2006 | Lippert et al. |
| 7,131,728 | B2 | 11/2006 | Nambudiri et al. |
| 7,158,096 | B1 | 1/2007 | Spitzer |
| 7,190,329 | B2 | 3/2007 | Lewis et al. |
| 7,209,271 | B2 | 4/2007 | Lewis et al. |
| 7,310,174 | B2 | 12/2007 | Wine et al. |
| 7,339,737 | B2 | 3/2008 | Urey et al. |
| 7,365,892 | B2 | 4/2008 | Sprague et al. |
| 7,400,432 | B2 | 7/2008 | Kovacs |
| 7,428,093 | B2 | 9/2008 | Tegreene et al. |
| 7,460,120 | B2 | 12/2008 | Yoshida et al. |
| 7,460,305 | B2 | 12/2008 | Powell et al. |
| 7,473,888 | B2 | 1/2009 | Wine |
| 7,538,724 | B1 | 5/2009 | Baillot |
| 7,567,282 | B2 | 7/2009 | Vice |
| 7,580,189 | B2 | 8/2009 | Urey et al. |
| 7,589,901 | B2 | 9/2009 | DeJong et al. |
| 7,639,209 | B2 | 12/2009 | Sprague et al. |
| 7,653,268 | B1 | 1/2010 | DeJong |
| 7,656,585 | B1 | 2/2010 | Powell et al. |
| 7,710,655 | B2 | 5/2010 | Freeman et al. |
| 7,715,103 | B2 | 5/2010 | Sprague et al. |
| 7,724,210 | B2 | 5/2010 | Sprague et al. |
| 7,733,572 | B1 | 6/2010 | Brown et al. |
| 7,736,006 | B2 | 6/2010 | Freeman et al. |
| 7,777,960 | B2 | 8/2010 | Freeman |
| 7,791,807 | B2 | 9/2010 | Pasca et al. |
| 7,791,809 | B2 | 9/2010 | Filipovich et al. |
| 7,791,810 | B2 | 9/2010 | Powell |
| 7,796,155 | B1 | 9/2010 | Neely, III et al. |
| 7,826,141 | B2 | 11/2010 | Powell et al. |
| 7,839,575 | B2 | 11/2010 | DeJong et al. |
| 7,843,403 | B2 | 11/2010 | Spitzer |
| 7,850,306 | B2 | 12/2010 | Uusitalo et al. |
| 7,854,523 | B2 | 12/2010 | Nestorovic et al. |
| 7,905,603 | B2 | 3/2011 | Freeman et al. |
| 7,949,214 | B2 | 5/2011 | DeJong |
| 7,954,953 | B2 | 6/2011 | Sprague |
| 7,956,858 | B2 | 6/2011 | Sprague et al. |
| 7,959,308 | B2 | 6/2011 | Freeman et al. |
| 7,978,189 | B2 | 7/2011 | Sprague et al. |
| 7,986,315 | B2 | 7/2011 | Sprague et al. |
| 8,160,411 | B2 | 4/2012 | Levola et al. |
| 2002/0196202 | A1 | 12/2002 | Bastian et al. |
| 2003/0210228 | A1 | 11/2003 | Ebersole et al. |
| 2004/0066793 | A1* | 4/2004 | Van Der Schaar .... H04N 19/61 370/437 |
| 2005/0275714 | A1 | 12/2005 | Ishikawa et al. |
| 2006/0262140 | A1 | 11/2006 | Kujawa et al. |
| 2007/0035562 | A1 | 2/2007 | Azuma et al. |
| 2007/0070508 | A1 | 3/2007 | Ruhle et al. |
| 2008/0074423 | A1 | 3/2008 | Gan et al. |
| 2008/0291219 | A1 | 11/2008 | Morita et al. |
| 2008/0298689 | A1* | 12/2008 | Ashbrook ......... G06F 17/30265 382/224 |
| 2009/0027772 | A1 | 1/2009 | Robinson |
| 2009/0096790 | A1 | 4/2009 | Wiedemann et al. |
| 2009/0141020 | A1 | 6/2009 | Freund et al. |
| 2010/0127971 | A1 | 5/2010 | Ellenby |
| 2010/0238161 | A1 | 9/2010 | Varga et al. |
| 2010/0259673 | A1 | 10/2010 | Russell |
| 2010/0290127 | A1 | 11/2010 | Kessler et al. |
| 2010/0305724 | A1 | 12/2010 | Fry et al. |
| 2011/0102460 | A1 | 5/2011 | Parker |
| 2011/0187744 | A1 | 8/2011 | Kim et al. |
| 2011/0227813 | A1 | 9/2011 | Haddick et al. |
| 2011/0254859 | A1 | 10/2011 | Matsuda |
| 2011/0270522 | A1 | 11/2011 | Fink |
| 2011/0282799 | A1 | 11/2011 | Huston |
| 2012/0002086 | A1 | 1/2012 | Free |
| 2012/0019557 | A1 | 1/2012 | Aronsson et al. |
| 2012/0120070 | A1 | 5/2012 | Baillot |
| 2013/0127851 | A1* | 5/2013 | Richards, Jr. ............ G06T 17/00 345/420 |
| 2014/0055491 | A1* | 2/2014 | Malamud .............. G06T 19/006 345/633 |
| 2014/0068444 | A1* | 3/2014 | Arrasvuori .......... G06F 17/3087 715/733 |

* cited by examiner

FIG.5C

AUGMENTED REALITY FOR WIRELESS MOBILE DEVICES

CROSS REFERENCE TO RELATED APPLICATIONS

This patent application is a divisional application of U.S. patent application Ser. No. 14/830,407 filed on Aug. 19, 2015, which is a continuation of U.S. patent application Ser. No. 13/837,902 filed Mar. 15, 2013, now U.S. Pat. No. 9,129,429, issued on Sep. 8, 2015, which claims benefit of priority of U.S. Provisional Application No. 61/717,788, entitled "Augmented Reality Control Systems" and filed on 24 Oct. 2012, the disclosure of which is incorporated herein by reference in its entirety.

FIELD OF THE INVENTION

The present invention relates to relates to a process of capturing and rendering data on a mobile device and, in particular, an augmented reality system that registers external information with real objects.

BACKGROUND OF THE INVENTION

Augmented Reality (AR) enhances a user's perception of, and interaction with, the real world. Virtual objects are used to display information utilized to perform real-world tasks. When based on an optical approach, a user directly sees the real world through optics, with graphics combined within the user's field of view. Spatially and temporally correct display of digital information on real world objects, however, is difficult to achieve on mobile AR devices. It would be desirable to have system that is device independent (phone, head mounted display, etc.), and that provides transport efficient (minimized data sets to address growing mobile network bandwidth issues along with high speed download) and process-bandwidth-efficient (simplified processing to maintain mobile device battery life and to provide low latency) geo-spatial registration of digital data onto real world objects.

SUMMARY OF THE INVENTION

The present invention is directed toward augmented reality for wireless mobile devices. A model representing objects located at corresponding geographic coordinates of a geographic coordinate system is stored in a memory device. The model includes a data structure of model layers in which a wireframe representation of the objects is represented in a base model layer. In the model, surface detail of the objects increases from the base model layer to an uppermost model layer. A data structure is also stored in the memory device which has a plurality of digital data layers encompassing digital coordinates of a digital coordinate system corresponding with respective geographic coordinates of the geographic coordinate system. Additionally, digital content is stored in the memory device on preselected one or more of the digital data layers at pre-selected digital coordinates thereon. The digital content includes data for augmenting scenes containing the objects at the respective locations. One or more of the digital data layers are logically linked with one or more of the model. The location and spatial orientation of a mobile device in which a scene is viewed by the mobile device is received. The digital content on the digital data layer logically linked to a selected one of the model layers for geographic coordinates that include the scene are transmitted over a wireless communication channel to the mobile device.

BRIEF DESCRIPTION OF THE DRAWINGS

Like reference numerals have been used to identify like elements throughout this disclosure.

DETAILED DESCRIPTION OF THE INVENTION

Figure 1:
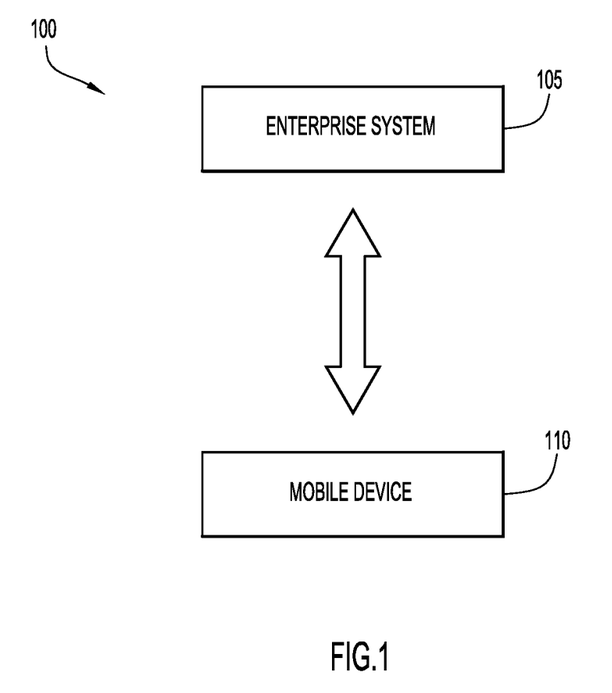
FIG. 1 illustrates a schematic view of an augmented reality system for executing a geo-registration process in accordance with an embodiment of the present invention.

Referring to FIG. 1, the augmented reality system 100 includes an enterprise system 105 and a mobile device 115 that communicates via a wireless network. The enterprise system 105 (also called a synthetic geometry or geo-registration server) generates and hosts the geometry or model, with the geometry being created outside of the system 105. This synthetic geometry may exist in several different forms, and may be hosted on the same system, with software access to any or all of the forms. The generation of the synthetic geometry may be accomplished using real world data or entirely synthesized data (i.e. 3D models) or a combination of the two. Specifically, synthetic geometry may be initially created from external, real world data via, e.g., synthetic aperture radar (SAR) or light detection and ranging (LIDAR). By way of example, LIDAR point clouds may be processed into surface geometry, or wireframes or two-dimensional imagery may be processed to create surface or texture models.

Figure 2A:
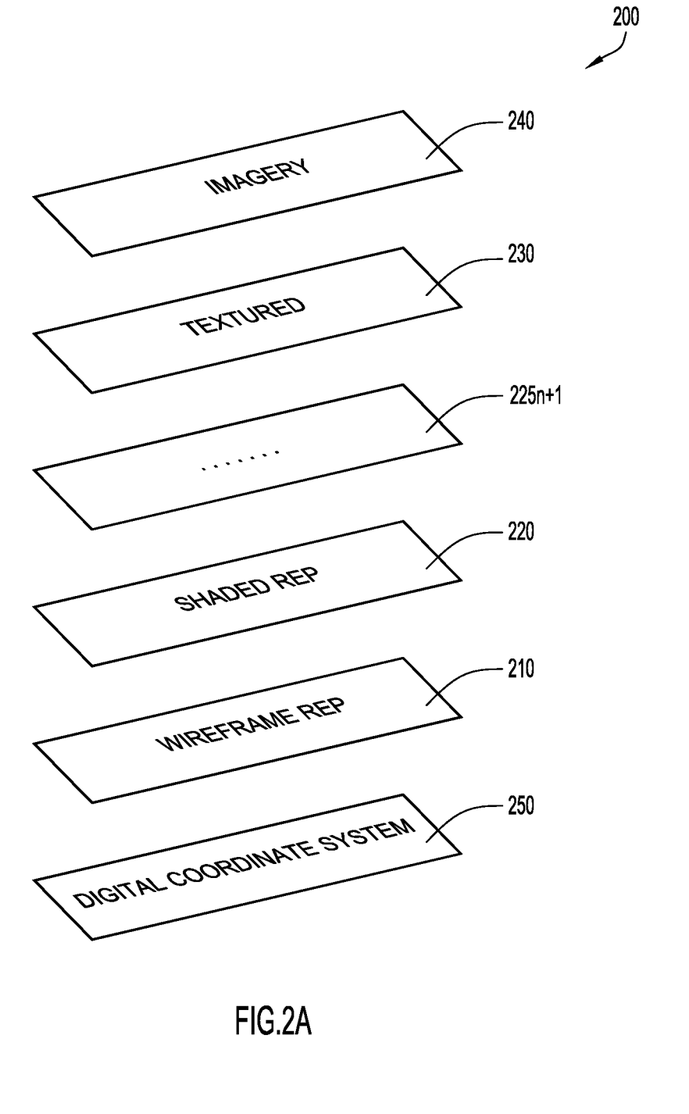
FIG. 2A illustrates a synthetic geometry model in accordance with an embodiment of the invention.
Figure 2B:
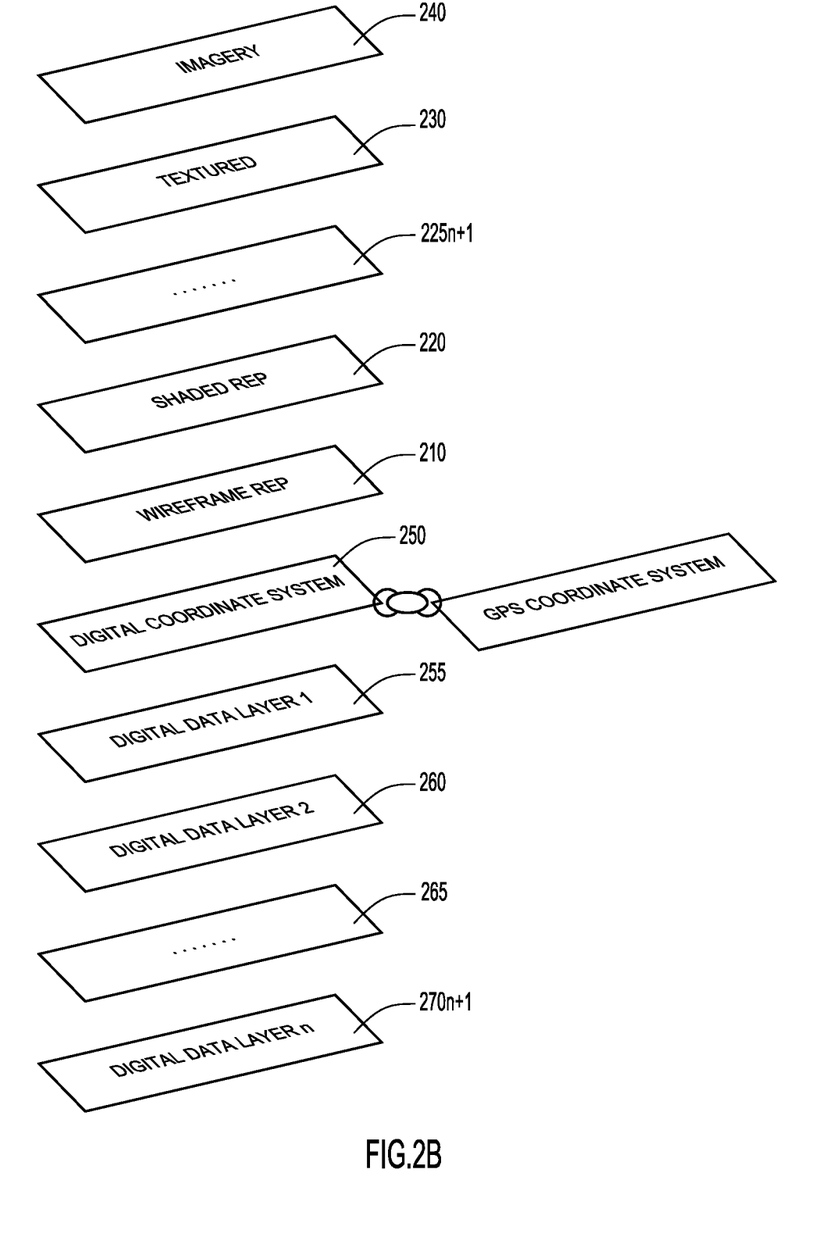
FIGS. 2B and 2C illustrate digital information (data layers) that may be associated with the synthetic geometry model in accordance with an embodiment of the invention.

The synthetic geometry 200 may include one or more layers or models of increasing complexity and/or detail. Referring to FIG. 2, showing a geometry configuration in accordance with and embodiment of the invention, the synthetic geometry 200 includes as its nominal base form a wire frame representation or model 210. Additional layers, moreover, may be set for various detail levels. As shown, the higher levels may include surface models 220, texture models 230, and imagery-based models 240. The imagery based model or layer 240 may take in imagery from a number of sources and, moreover, may contain geo-location coordinates. These models 210-240 may be used in a layer-like context, with more detailed layers on top of simpler (less detailed) layers, resulting in transport efficiency that increases from the top (imagery) layer toward the bottom (wireframe) layer. In the illustrated embodiment, while the simplest geometric representations is a wireframe model, it should be understood that the layers may be further simplified to a smaller group of lines or even reference points that can have their real world versions extracted from video imagery. In addition, the model may contain any number of models $225n+1$.

The synthetic geometry 200 is based on a digital coordinate system 250. That is, the key imagery points, derived from the synthetic geometry, are used for the digital coordinate system data points. The digital coordinate system may be the same as a GPS coordinate system or, at a minimum, or may be correlated to a GPS coordinate system (the GPS coordinate system may be simplified to any general, external, widespread coordinate system, i.e. an accessible, ubiquitous coordinate system).

The enterprise system 105, then, generates a wireframe model or other simplified representation of real world objects (i.e. surface models) designed to register digital content with the real world. In the wireframe model, geographic image sources are assigned coordinate points to key data set features, i.e., every endpoint of lines of wireframe where the coordinates are based on GPS location information. For example, the edges of a building include distinct coordinate values, as does the edges of a street. The enterprise system 105 extracts these coordinate values from the image sources to generate a wireframe representation of the world. Stated another way, the enterprise system 105 creates a simplified geometry of the real world objects (synthetic geometry) from sources other than the mobile device. The wireframe representation, then, is a mathematically efficient geo target set.

Content authoring tools (software development kits or SDKs) may use this synthetic geometry construct to create and geo-register content, with the content containing links to the digital coordinate system to control placement of the digital data. The layer construct may be used in the same way that animation software constructs content by first working with wireframe geometry and then incrementally adds geometry details such as shading and texturing to minimize processing when generating the content. This processing minimization is primarily performed to minimize the development time from the time required to render the images. The effect of using the simplified geometry sets or layers for content generation will be to allow accurate content placement and faster development of the content, giving developers the ability to control the accuracy and duration of their work.

The content authoring tools may be given access to the synthetic geometry databases via an Application Programming Interface (API) that enables web based access. The web basis for this is required so that the database is always kept up-to-date and the content developers always access the most up-to-date geometry. Content generator web access will also enable the connections necessary for end user access and tracking.

Figure 2C:
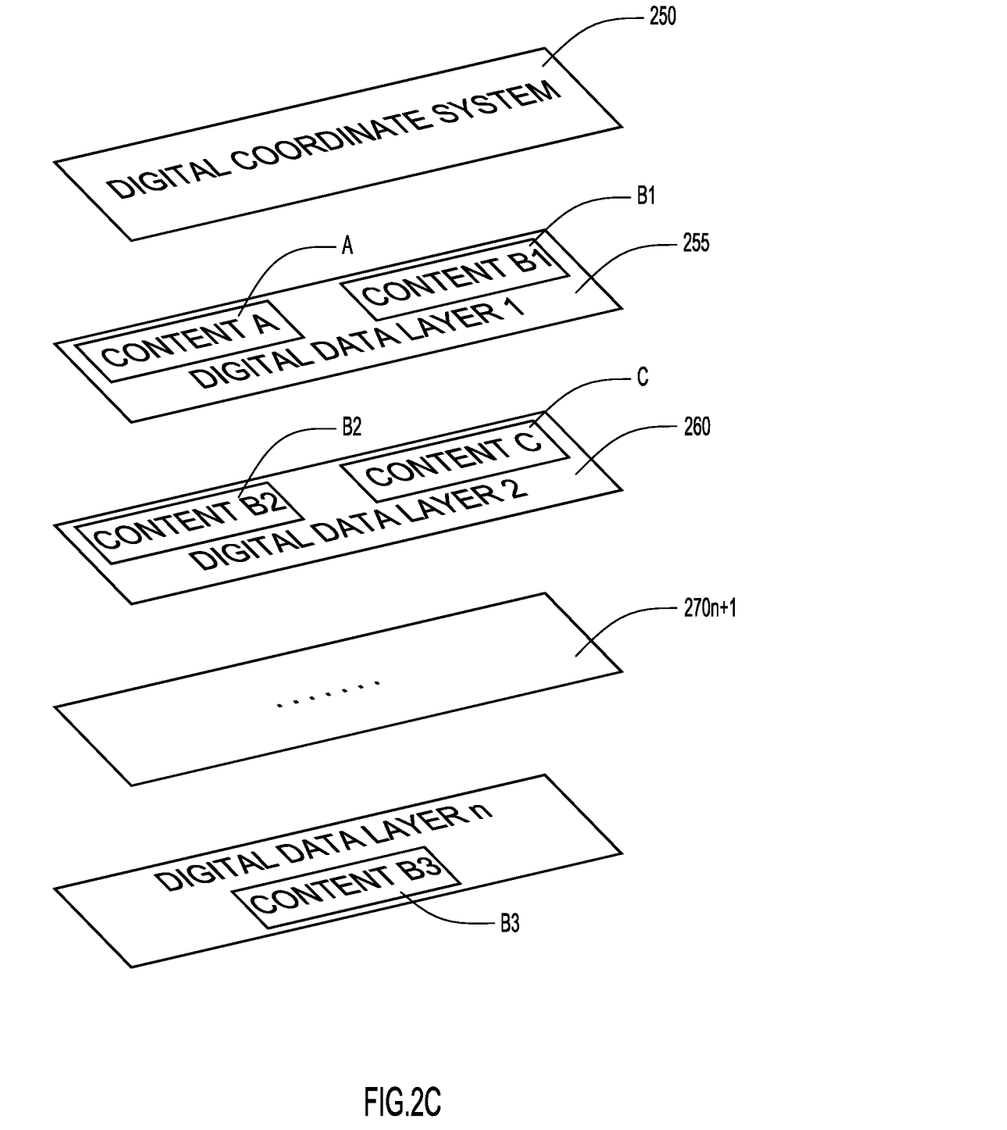
Figure 2D:
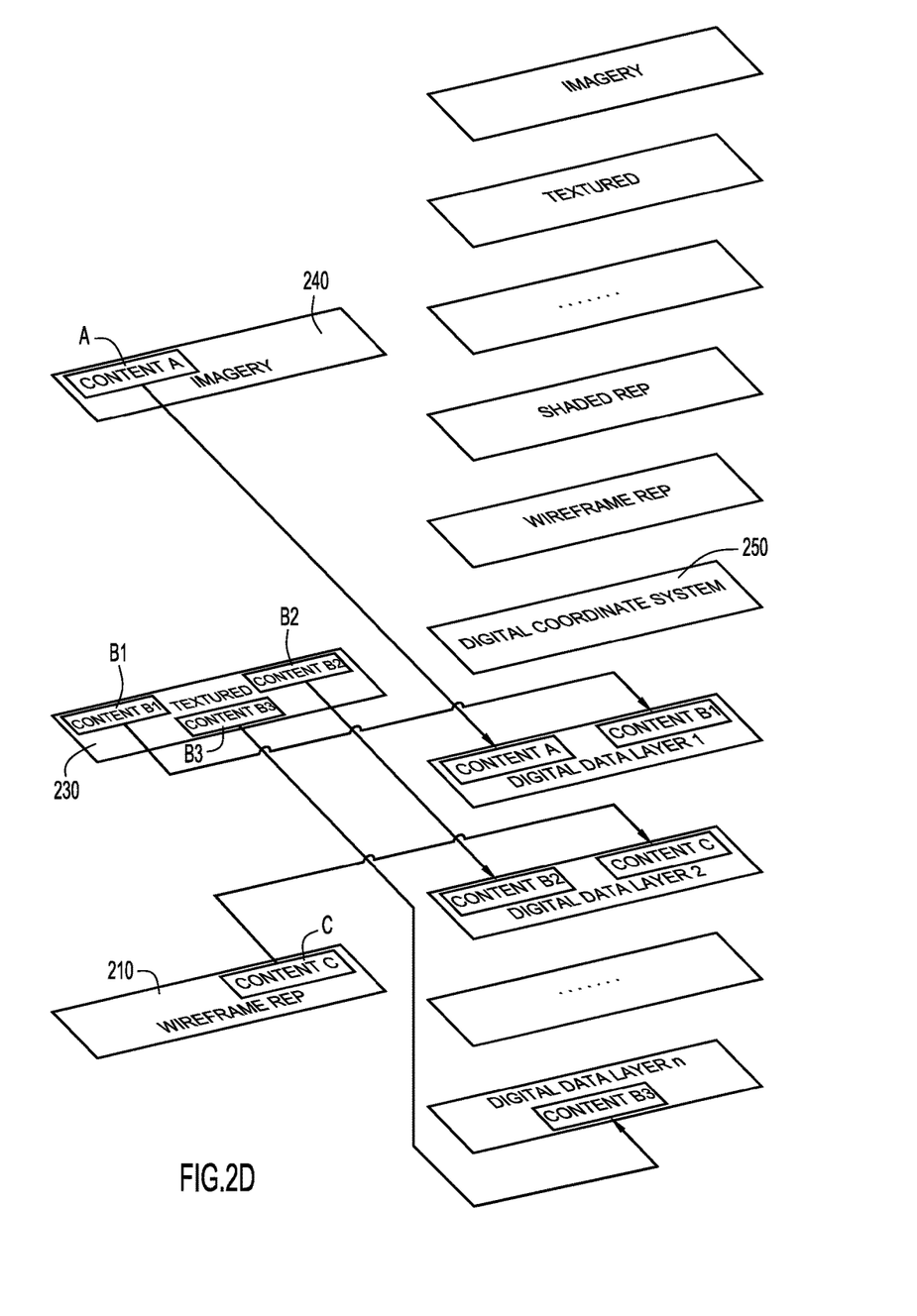
FIG. 2D illustrates the synthetic geometry model of FIG. 2A associated with the digital data of FIG. 2C.

In this manner, the content authoring tools may be utilized to develop digital content/information utilizing the synthetic geometry 200, which is then saved on the enterprise system in a layered structure (with data existing on one or many layers). This digital data information is then associated with the geometry model (e.g., the nominal layer of the model). Specifically, n+1 data layers may be created. Referring to FIGS. 2C-2D, a first digital data layer 255 including content A and content B1, a second digital data layer 260 including content B2 and content C, a third digital data layer 265, and a fourth digital data layer $270n+1$ including content B3 may be provided. As shown in FIG. 2D, the digital data—the content A, B1, B2, B3, C—may be selective associated with one or more of the geometry model layers 210, 220, $225n+1$ 230, 240. The digital data layers 255, 260, 265, $270n+1$ are essentially filters, being selected and organized via the content authoring tools. Digital data layers 255, 260, 265, $270n+1$ may be organized in any number of ways, including by importance, location (nearest item taking priority), temporal based, etc.

In operation, user filters on the mobile device may be used to select the predefined digital data layers, or to generate new selection filters that cross multiple digital data layers or filter within a layer. All of the content includes metadata with the geo-location information, along with the nominal layer and grouping information.

The mobile device 115 may include one or more processing devices for executing a software application (i.e., software program instructions). In an embodiment, the mobile device 115 includes a mobile telephone such as a smartphone or a tablet computer. In the embodiment illustrated in FIG. 3, the mobile device 115 is a head-up display in the form of eyewear including one or more cameras 310 and a display system 320 configured to display images on the lenses 330 of the eyewear. For example, the display system 320 may be an OLED microdisplay that projects an illuminated image toward the lens. In other embodiments, the mobile device may also be a mobile phone, tablet, or other portable computing device that includes a display.

Figure 3:
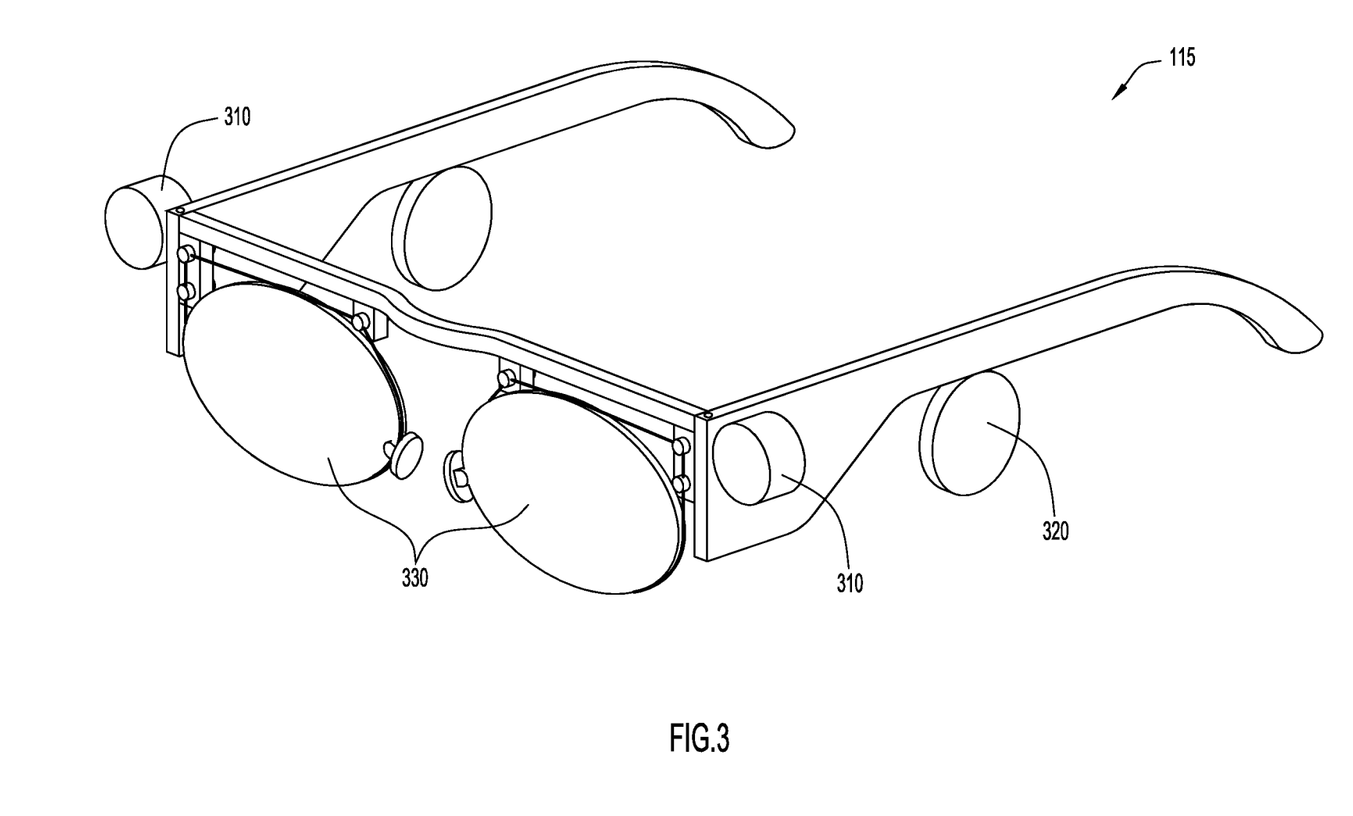
FIG. 3 illustrates a mobile device in accordance with an embodiment of the invention.

The mobile device 115 is equipped with one or more of a global positioning system (GPS) device, a compass, and an inertial measurement unit (IMU). In addition, the mobile device 115 includes a data transceiver operable to wirelessly transmit data to (e.g., GPS and camera image data) and to receive data (digital data) from the enterprise system 105. Additionally, the mobile device 115 may be configured to engage in wireless communications such as sending and receiving telephone calls and/or wireless data in conjunction with text messages such as emails, short message service (SMS) messages, pages and other data messages that may include multimedia attachments, documents, audio files, video files, images and other graphics. Accordingly, the mobile device 115 may include a wireless transceiver for communicating over a long range wireless network such as a cellular, PCS, CDMA, GPRS, GSM, iDEN or other wireless communications network. Alternatively or in addition to, the wireless communication may further include a transceiver for communicating over a short-range wireless network such as an IEEE 802.11 compatible network, a Wimax network, another wireless local area network connection or other communications link. By way of example, the mobile device 115 may include a short or medium range transceiver operating in conjunction with a communication standard such Bluetooth® or other standard short or medium range communication protocol.

The mobile device 115 further includes executable software that initiates the data transfer process. The software may be stored on the mobile device 115 in the form of a specialized application, or may be executed via HTML5. In operation, as shown in the on-device process flow 400 provided in FIGS. 4A and 4B, in Steps 405, 410, and 415, the device software will selectively read the GPS, IMU, and magnetometers (e.g., a compass), and/or other sensors disposed on the mobile device 115. For example, the software reads the IMU and magnetometer to determine the location and pointing vector of the user, and reads the GPS to determine the user's location. Alternatively, the mobile device 115 may use other methods for determining its location such as WLAN (WI-FI) or other technologies. When navigating indoors, the system could use WLAN information to download indoor layouts and use multiple WLAN sources or other RF for image based sources for navigation reference points.

Figure 4A:
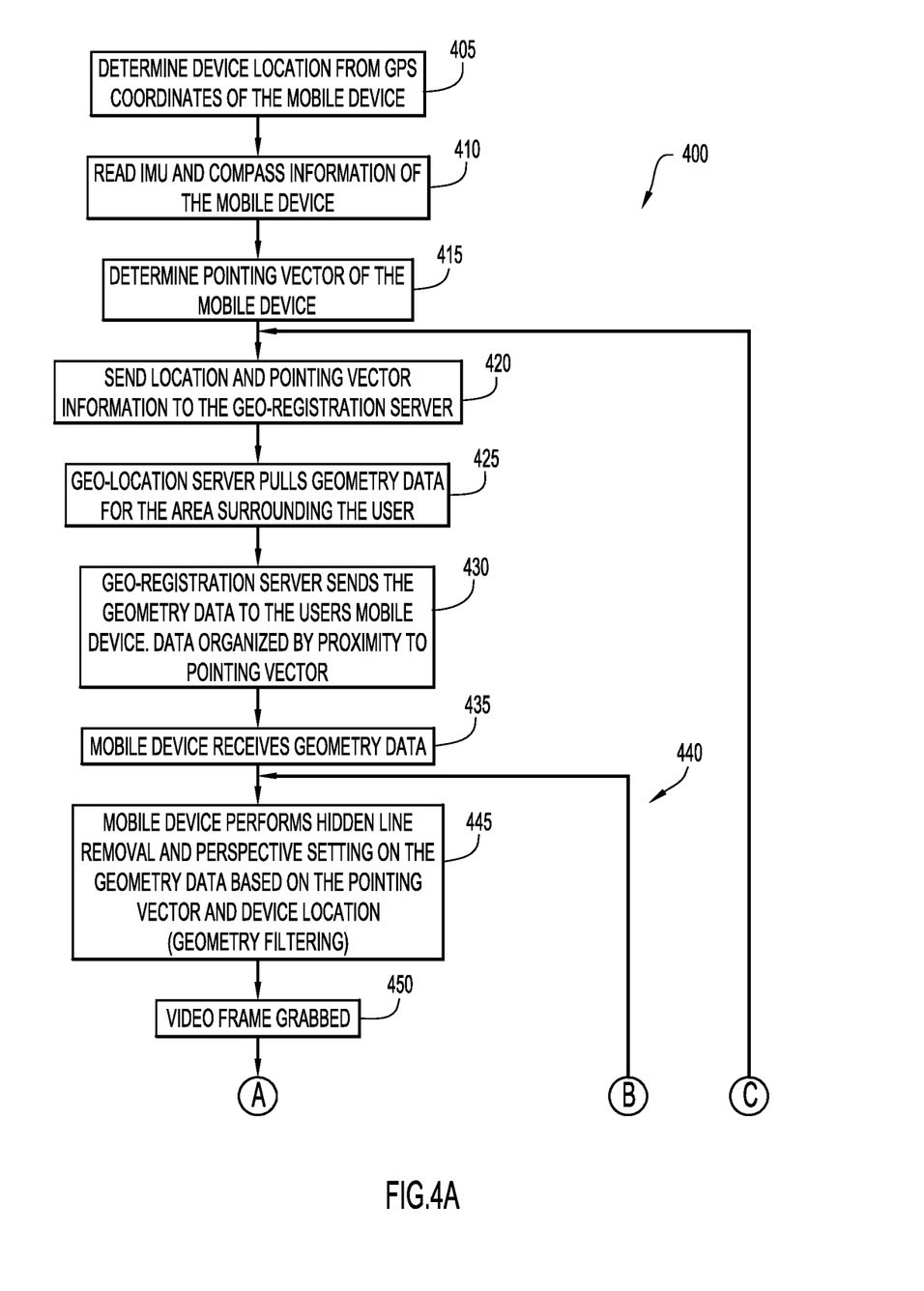
FIGS. 4A and 4B illustrate an on-device registration process for an augmented reality system in accordance with an embodiment of the invention.

In Step 420, this location information will be sent to the enterprise system 105 (i.e. the synthetic geometry server). The enterprise system 105 pulls geometry data for the area surrounding the user (Step 425), and then sends back to the user a nominal geometry set (Step 430), which is received by the mobile device 115 (Step 435). For example, the enterprise system 105 pulls and sends a 2 km diameter wireframe representation of the user's geo-location. This query to the enterprise system 105 may serve to trigger user tracking initiation.

In the case of a user moving into areas with poor connectivity, the user may download the synthetic geometry in advance, or the range or area of the synthetic geometry may be increased (relevant data for the area may also be downloaded for later use). The surrounding geometry and extra information including geometry beyond the original set may be saved or cached within the mobile device to improve the load times when the user is moving through different areas. The mobile device may pull this extra information based on dynamic bandwidth measurement, i.e., pulling information if there is available bandwidth.

An additional method for reducing the downloaded dataset is to use a prefetch function that downloads information based on previous user requests for a particular area. Based on system expectations of where the user is going, i.e., from the destination address, etc. the system may download the information for that location in advance.

As noted above, the IMU and magnetometers will set the user's pointing vector (where the user is looking based on the orientation of the mobile device 115, i.e. what the screen shows on a mobile phone or imagery from cameras on a head mounted system). Alternatively, the pointing vector may be determined from the GPS position of the user and a comparison of imagery from the camera on the mobile device to imagery databases. The original query for information may also operate on this pointing vector to reduce the overall data download requirements, i.e. download a smaller geometry set. The mobile device could select the level of data to download based on dynamic bandwidth measurements. The mobile device may start with the data around the pointing vector, and sequentially load in the geometry and additional information outside the pointing vector.

The software on the mobile device 115 enters a loop 440, extracting the synthetic geometry and generating a pre-filter that is a reduced data set enabling simplified computation on the mobile device (Step 445). This pre-filtering, for example, may entail hidden line removal and perspective setting for wireframe geometry. The resulting pre-filtered data is used for a geometry correlation engine on the mobile device. The pre-filtering reduces the size of the data set required for correlation and provides the targets for correlation. The correlation will look at the synthetic geometry and try to match real world geometry to it, i.e. the edges of buildings as lines of wireframes may be matched to real building edges. The real world geometry used in the correlation engine is extracted from one or more cameras or imagers on the mobile device.

The camera on the mobile device 115 captures frames of video (Step 450) from which the geometry is extracted. The extraction may be accomplished on each single frame; alternatively, if there is no movement sensed by the device sensors, the frequency of extraction may be reduced. Algorithms for geometry extraction (e.g., edge extraction, face extraction, etc.) implemented in code extract the relevant information from geometric objects such as buildings in the imager's field of view (i.e. extraction of the edges from the sides and roof of a building). Additionally, other sensors may provide inputs to the correlation engine, such as the accelerometers to provide the nominal gravity vector. Additional processing routines (FFTs, wavelet transforms, etc.) may additionally be used to help find the desired geometries. Processing routines may also be used to find predominating orientation vectors such as verticals and horizontals that will aid in establishing the user's pose (i.e. find the dominate features assuming predominate orientations of those frequencies). Additionally, more advanced imaging capabilities such as polarimetry may be used to help in determining orientation.

Figure 4B:
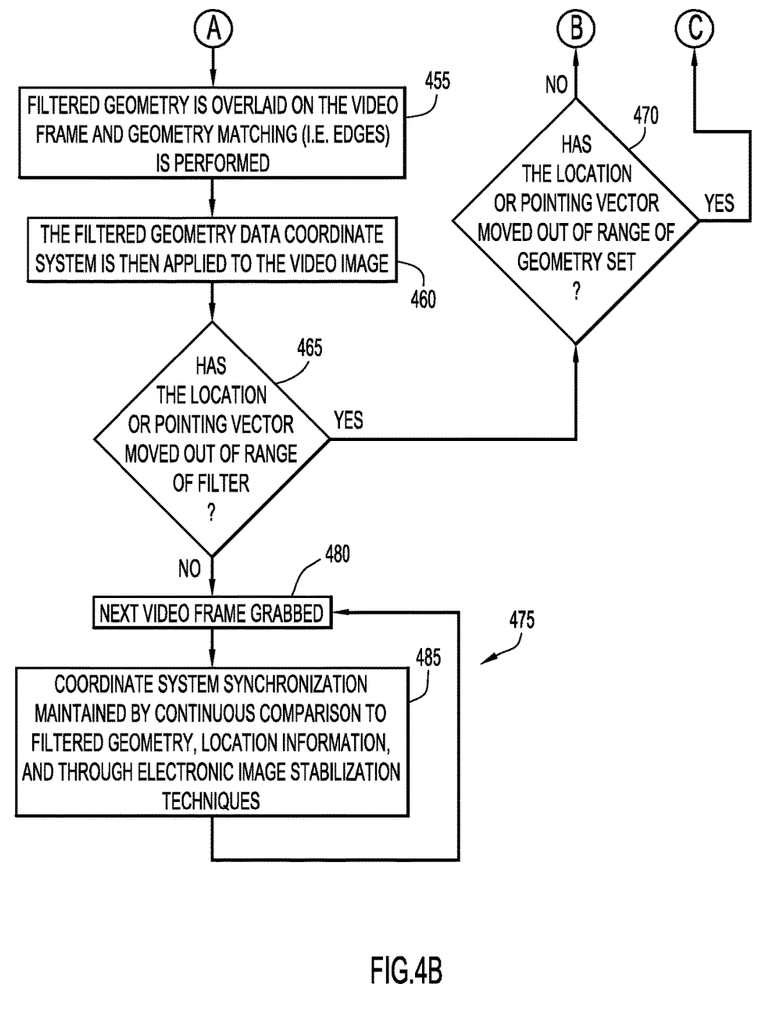

The filtered geometry is overlaid on the video frame and geometry matching (i.e., overlaid onto edges) is performed (Step 455), with the filtered geometry data coordinate system then being applied to the video image (Step 460). If the location of the pointing vector of the mobile device has changed, the process is directed back into the loop 440 (step 465), the process determines whether the movement is beyond the range of the geometry data set (Step 470) and, if so, reenters the loop 440.

If the location of the pointing vector has not moved out of the range of the filter, the process continues into another loop 475, in which the next video frame being grabbed (Step 480) and the coordinate system synchronization maintained by continuous comparison to filtered geometry, location information, and through electronic image stabilization techniques (Step 485).

Figure 5A:
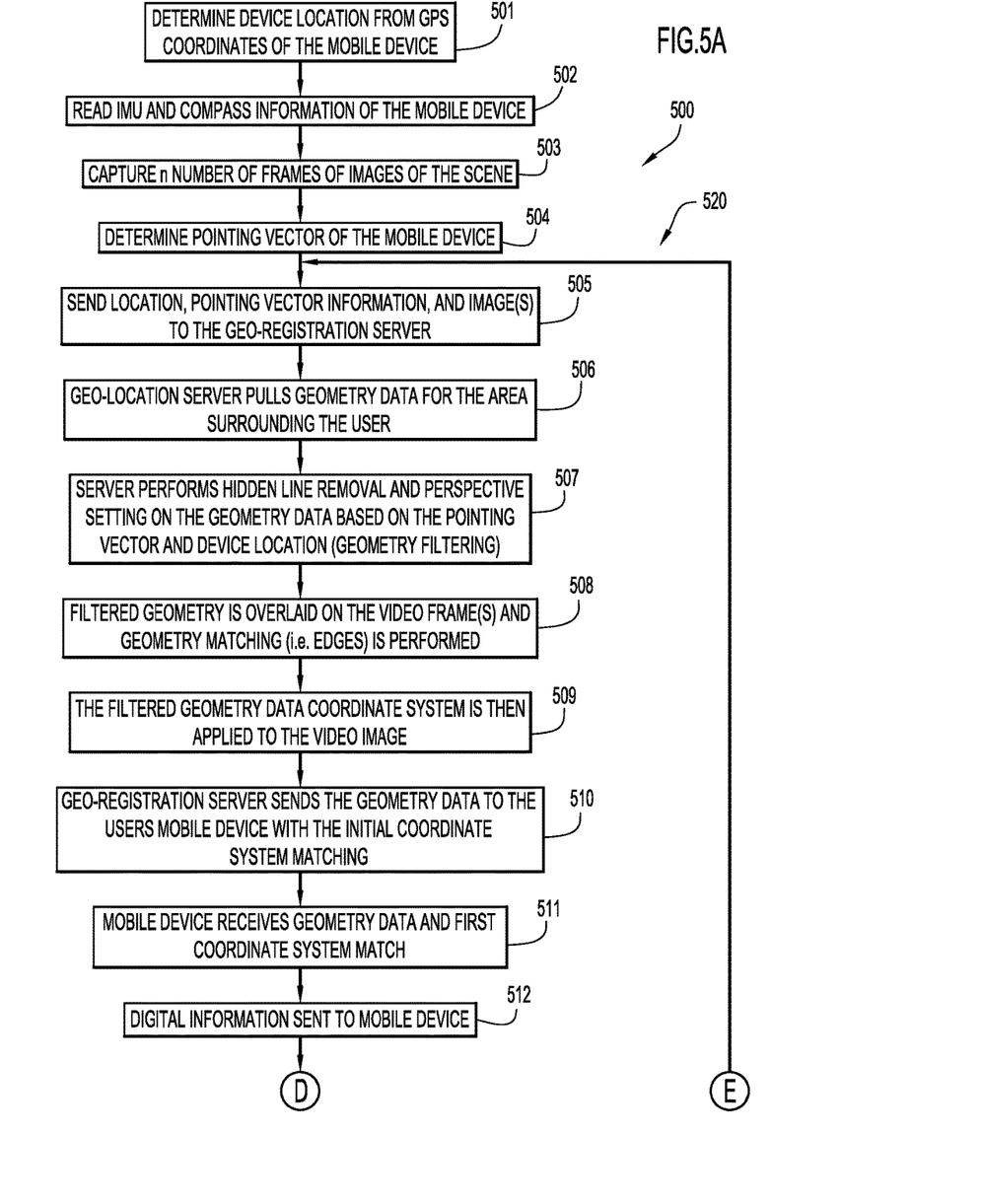
FIGS. 5A, 5B, and 5C illustrate an off-device process flow for an augmented reality system in accordance with an embodiment of the invention.
Figure 5B:
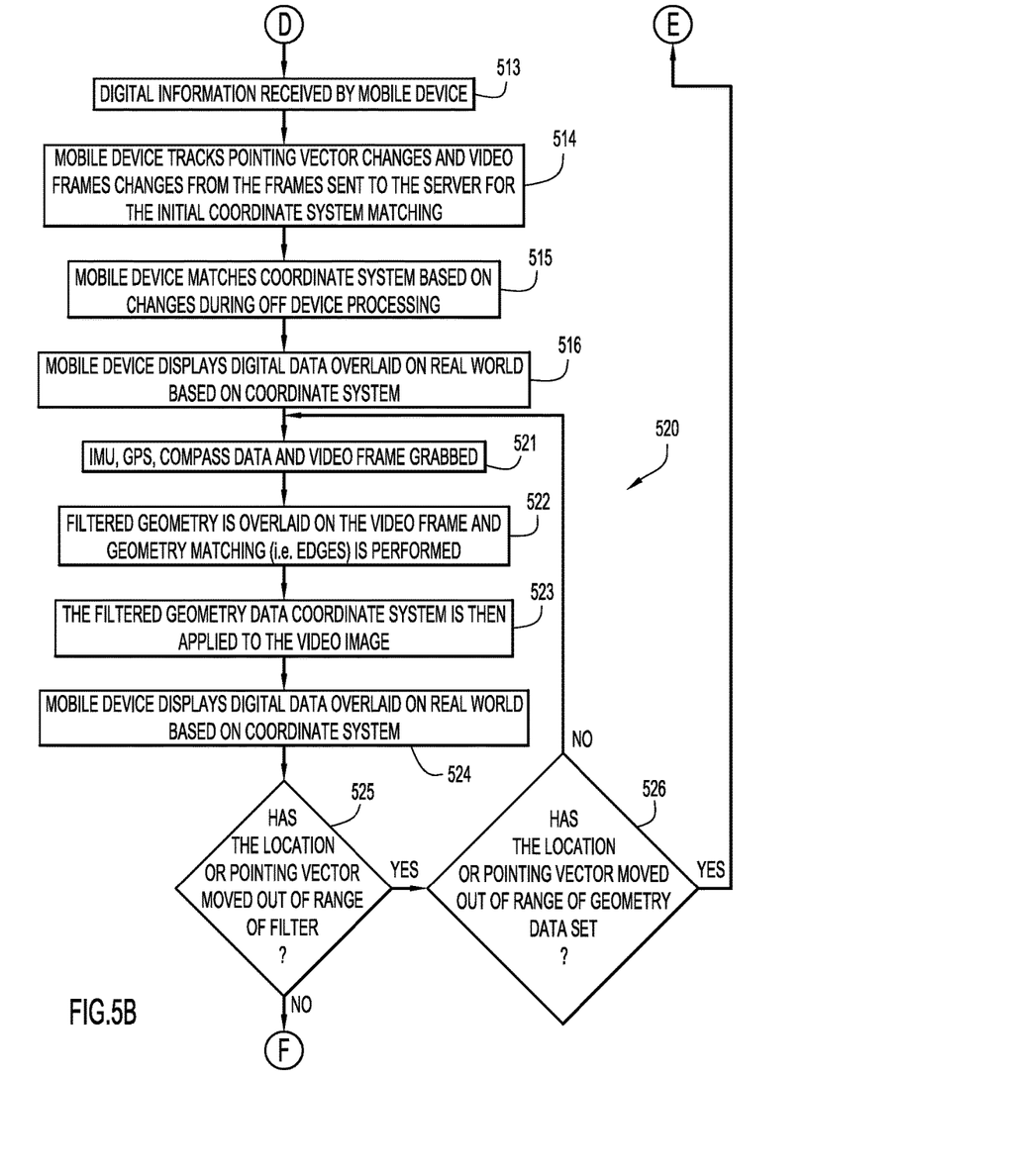
Figure 5C:
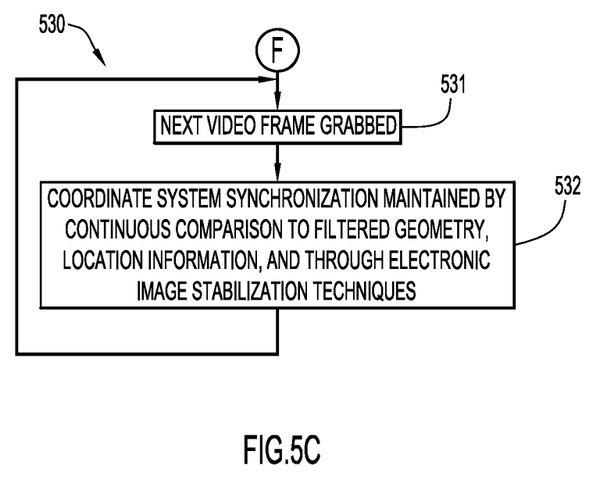

An alternate process flow 500 where the initial matching or subsequent occasional matching is performed off of the mobile device 115, i.e., at the enterprise or other similar level, (e.g., cloud based processing) is shown in FIGS. 5A, 5B, and 5C. The offloading of the processing from the mobile device onto external resources may be partitioned in any number of ways in order to optimize on device power consumption, processing bandwidth, transport bandwidth, etc. As illustrated, the mobile device 115 determines its location coordinates via, e.g., GPS (Step 501), as well as reads the device's IMU and/or compass (Step 502). After capturing image frames (Step 503), the device 115 determines its pointing vector (Step 504), and sends this information to the enterprise system 105 (Step 505). The enterprise server extracts geometry data for the area surrounding the user (Step 506), and then performs geometric filtering (Step 507). The filtered geometry is overlaid onto the video frame and geometry matching is executed (Step 508), and then supplied to the video image (Step 509).

At this stage, the enterprise system 105 sends the geometry data to the mobile device 115, along with the initial coordinate system matching (Step 510), the data being received by the mobile device (Step 511). Additionally, digital information is sent to (Step 512) and received by (Step 513) the mobile device 115. The mobile device 115 tracks any pointing vector changes from the frames sent to the enterprise server during the initial coordinate system matching (Step 514), and then matches the coordinate system based on any changes that occurred during off-device process (Step 515). The mobile device 115 now displays digital data, overlaying it onto the real world view (Step 516). The process continues entering a feedback loop 520 (Steps 521-526), as needed. That is, to improve system accuracy, a feedback loop may be included between the GPS, IMU, and magnetometers. As the GPS is periodically updated during movement, a path may be correlated to the IMU and magnetometer signals.

At this point, the process may enter another loop 530, with the next video frame being grabbed (Step 531) and the coordinate system being maintained as indicated (Step 532).

The user may be given the option of performing a manual overlay of the geometry onto the real world imagery if the system cannot perform an adequate lock. Other methods of providing a lock may incorporate a calibration process, an example of which may be accomplished through the image capture of a known object (at a known location). The scaling of the object may provide distance, while the edges or other geometry information may be used to set orientation of the user. The use of multiple objects may further increase accuracy.

Another feedback loop using existing photographic databases may be constructed. Correlation edges and/or image correlation from known poses and positional data incorporated in metadata associated with 2D imagery may be used to correlate the user's position and pose.

The use of synthetic geometry may additionally be used for indoor registration and the setting of way points or otherwise used for navigation. The edges of walls, doors, pillars, windows, etc. from architectural or design drawings (a form of synthetic geometry) may be used for the edge matching filters on the mobile device. The geometry of the building may be downloaded to the mobile device, and the same processing as is done for outdoor geometry may be used to geo-register the mobile device, i.e., hidden line removal, perspective setting, geometry correlation, etc. With the geometry of the interior structure known, distances between features will also be known, so that as the geometry is correlated, the user's changing position within the structure may also be correlated, allowing the user to navigate within the building.

While the invention has been described in detail and with reference to specific embodiments thereof, it will be apparent to one skilled in the art that various changes and modifications can be made therein without departing from the spirit and scope thereof. For example, while a mobile device is illustrated, the instructions for performing application functions may be included in any computer program product configured for execution by one or more processors.

Thus, it is intended that the present invention cover the modifications and variations of this invention that come within the scope of the appended claims and their equivalents. It is to be understood that terms such as "left", "right" "top", "bottom", "front", "rear", "side", "height", "length", "width", "upper", "lower", "interior", "exterior", "inner", "outer" and the like as may be used herein, merely describe points of reference and do not limit the present invention to any particular orientation or configuration.

I claim:

1. A method for reality augmentation comprising:
storing, in a memory device:
a model representing real world objects located at corresponding geographic coordinates of a geographic coordinate system, the model comprising a data structure of model layers in which a wireframe representation of the real world objects is represented in a base model layer and in which surface detail of the real world objects increases from the base model layer to an uppermost model layer;
a data structure having a plurality of digital data layers encompassing digital coordinates of a digital coordinate system corresponding with respective geographic coordinates of the geographic coordinate system; and
digital content on pre-selected one or more of the digital data layers at pre-selected digital coordinates thereon, the digital content comprising data for augmenting scenes containing the real world objects at the respective locations;
logically linking one or more of the digital data layers with one or more of the model layers to locate the digital content within the scenes based upon the digital coordinates and the model;
receiving the location and spatial orientation of a mobile device in which a scene is viewed by the mobile device that overlaps with the geographic coordinates; and
transmitting, over a wireless communication channel to the mobile device, the digital content on the digital data layer logically linked to a selected one of the model layers for geographic coordinates that include the scene viewed by the mobile device to augment the scene viewed by the mobile device using the digital content.

2. The method of claim 1, wherein transmitting the digital content further comprises:
transmitting the digital content on the base model layer as the selected model layer and the wireframe representation of the real world objects in the scene viewed by the mobile device.

3. The method of claim 2, wherein transmitting the digital content further comprises:
transmitting the digital content and the wireframe representation of the real world objects in a predetermined area surrounding the location of the mobile device.

4. The method of claim 1, further comprising:
identifying key features in image data of the real world objects, each of the key features being located at known geographic coordinates of the geographic coordinate system; and
constructing the wireframe representation of the image data from data points at the digital coordinates of the digital coordinate system corresponding to the known geographic coordinates of identified key features; and
storing the wireframe model on the base model layer.

5. The method of claim 1, further comprising:
retrieving the base model layer corresponding with image data presented in the view of the mobile device in response to receiving the image data and the location of the mobile device;
registering the wireframe representation of the retrieved base model layer on the received image data; and
transmitting the digital content at the digital coordinates on the digital data layer corresponding with the geographic coordinates of the registered image data.

6. The method of claim 1, further comprising:
determining bandwidth of the wireless communication channel; and
transmitting, over the wireless communication channel, one of the model layers having greater surface detail than the wireframe representation on the base model layer with the digital content on the digital data layer logically linked therewith based on the determined bandwidth.

7. A server apparatus for augmenting reality comprising:
a memory device configured to store:
a model representing real world objects located at corresponding geographic coordinates of a geographic coordinate system, the model comprising a data structure of model layers in which a wireframe representation of the real world objects is represented in a base model layer and in which surface detail of the real world objects increases from the base model layer to an uppermost model layer;

a data structure having a plurality of digital data layers encompassing digital coordinates of a digital coordinate system corresponding with respective geographic coordinates of the geographic coordinate system; and digital content on pre-selected one or more of the digital data layers at pre-selected digital coordinates thereon, the digital content comprising data for augmenting scenes containing the real world objects at the respective locations; and a processor configured to:

logically link one or more of the digital data layers with one or more of the model layers to locate the digital content within the scenes based upon the digital coordinates and the model;

receive the location and spatial orientation of a mobile device in which a scene is viewed by the mobile device that overlaps with the geographic coordinates; and transmit, over a wireless communication channel to the mobile device, the digital content on the digital data layer logically linked to a selected one of the model layers for geographic coordinates that include the scene viewed by the mobile device to augment the scene viewed by the mobile device using the digital content.

8. The server apparatus of claim 7, wherein the processor is further configured to:

transmit the digital content on the base model layer as the selected model layer and the wireframe representation of the real world objects in the scene viewed by the mobile device.

9. The server apparatus of claim 8, wherein the processor is further configured to:

transmit the digital content and the wireframe representation of the real world objects in a predetermined area surrounding the location of the mobile device.

10. The server apparatus of claim 7, wherein the processor is further configured to:

identify key features in image data of the real world objects, each of the key features being located at known geographic coordinates of the geographic coordinate system; and construct the wireframe representation of the image data from data points at the digital coordinates of the digital coordinate system corresponding to the known geographic coordinates of identified key features; and store the wireframe model on the base model layer.

11. The server apparatus of claim 7, wherein the processor is further configured to:

retrieve the base model layer corresponding with image data presented in the view of the mobile device in response to receiving the image data and the location of the mobile device;

register the wireframe representation of the retrieved base model layer on the received image data; and transmit the digital content at the digital coordinates on the digital data layer corresponding with the geographic coordinates of the registered image data.

12. The server apparatus of claim 7, wherein the processor is further configured to:

determine bandwidth of the wireless communication channel; and transmit, over the wireless communication channel, one of the model layers having greater surface detail than the wireframe representation on the base model layer with the digital content on the digital data layer logically linked therewith based on the determined bandwidth.

13. A non-transitory, tangible computer-readable medium having stored thereon processor instructions that, when executed by a processor, causes the processor to:

store, in a memory device:

a model representing real world objects located at corresponding geographic coordinates of a geographic coordinate system, the model comprising a data structure of model layers in which a wireframe representation of the real world objects is represented in a base model layer and in which surface detail of the real world objects increases from the base model layer to an uppermost model layer;

a data structure having a plurality of digital data layers encompassing digital coordinates of a digital coordinate system corresponding with respective geographic coordinates of the geographic coordinate system; and digital content on pre-selected one or more of the digital data layers at pre-selected digital coordinates thereon, the digital content comprising data for augmenting scenes containing the real world objects at the respective locations;

logically link one or more of the digital data layers with one or more of the model layers to locate the digital content within the scenes based upon the digital coordinates and the model;

receive the location and spatial orientation of a mobile device in which a scene is viewed by the mobile device that overlaps with the geographic coordinates; and transmit, over a wireless communication channel to the mobile device, the digital content on the digital data layer logically linked to a selected one of the model layers for geographic coordinates that include the scene viewed by the mobile device to augment the scene viewed by the mobile device using the digital content.

14. The computer-readable medium of claim 13, wherein the processor instructions include processor instructions that cause the processor to:

transmit the digital content on the base model layer as the selected model layer and the wireframe representation of the real world objects in the scene viewed by the mobile device.

15. The computer-readable medium of claim 14, wherein the processor instructions include processor instructions that cause the processor to:

transmit the digital content and the wireframe representation of the real world objects in a predetermined area surrounding the location of the mobile device.

16. The computer-readable medium of claim 13, wherein the processor instructions include processor instructions that cause the processor to:

identify key features in image data of the real world objects, each of the key features being located at known geographic coordinates of the geographic coordinate system; and construct the wireframe representation of the image data from data points at the digital coordinates of the digital coordinate system corresponding to the known geographic coordinates of identified key features; and store the wireframe model on the base model layer.

17. The computer-readable medium of claim 13, wherein the processor instructions include processor instructions that cause the processor to:

retrieve the base model layer corresponding with image data presented in the view of the mobile device in response to receiving the image data and the location of the mobile device;

register the wireframe representation of the retrieved base model layer on the received image data; and transmit the digital content at the digital coordinates on the digital data layer corresponding with the geographic coordinates of the registered image data.

18. The computer-readable medium of claim 13, wherein the processor instructions include processor instructions that cause the processor to:

determine bandwidth of the wireless communication channel; and transmit, over the wireless communication channel, one of the model layers having greater surface detail than the wireframe representation on the base model layer with the digital content on the digital data layer logically linked therewith based on the determined bandwidth.

* * * * *